Sept. 8, 1953      E. J. JUSTUS      2,651,077
MACHINE FOR COATING WITH THERMOPLASTIC MATERIALS
Filed Dec. 30, 1950      4 Sheets-Sheet 1

Inventor:
Edgar J. Justus
by
Attys

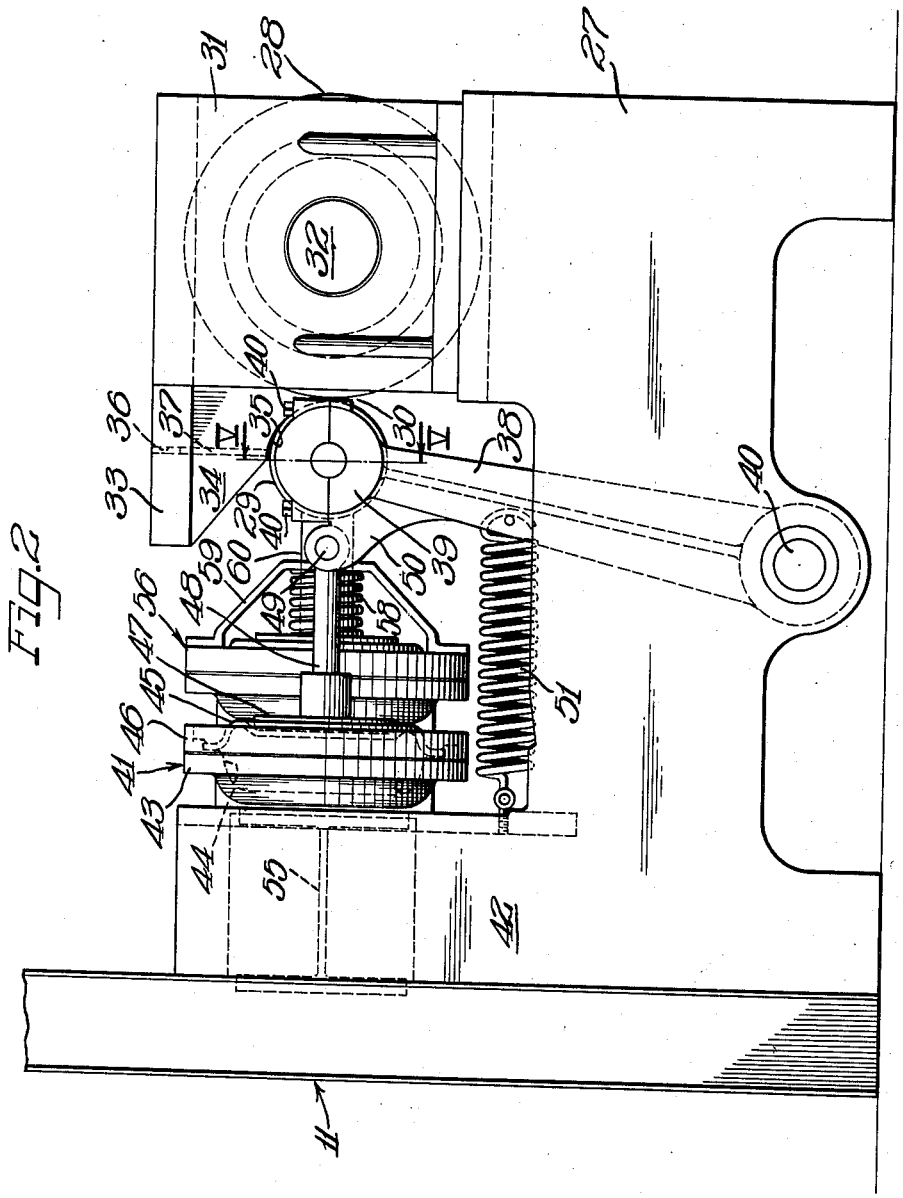

Sept. 8, 1953      E. J. JUSTUS      2,651,077
MACHINE FOR COATING WITH THERMOPLASTIC MATERIALS
Filed Dec. 30, 1950      4 Sheets-Sheet 3
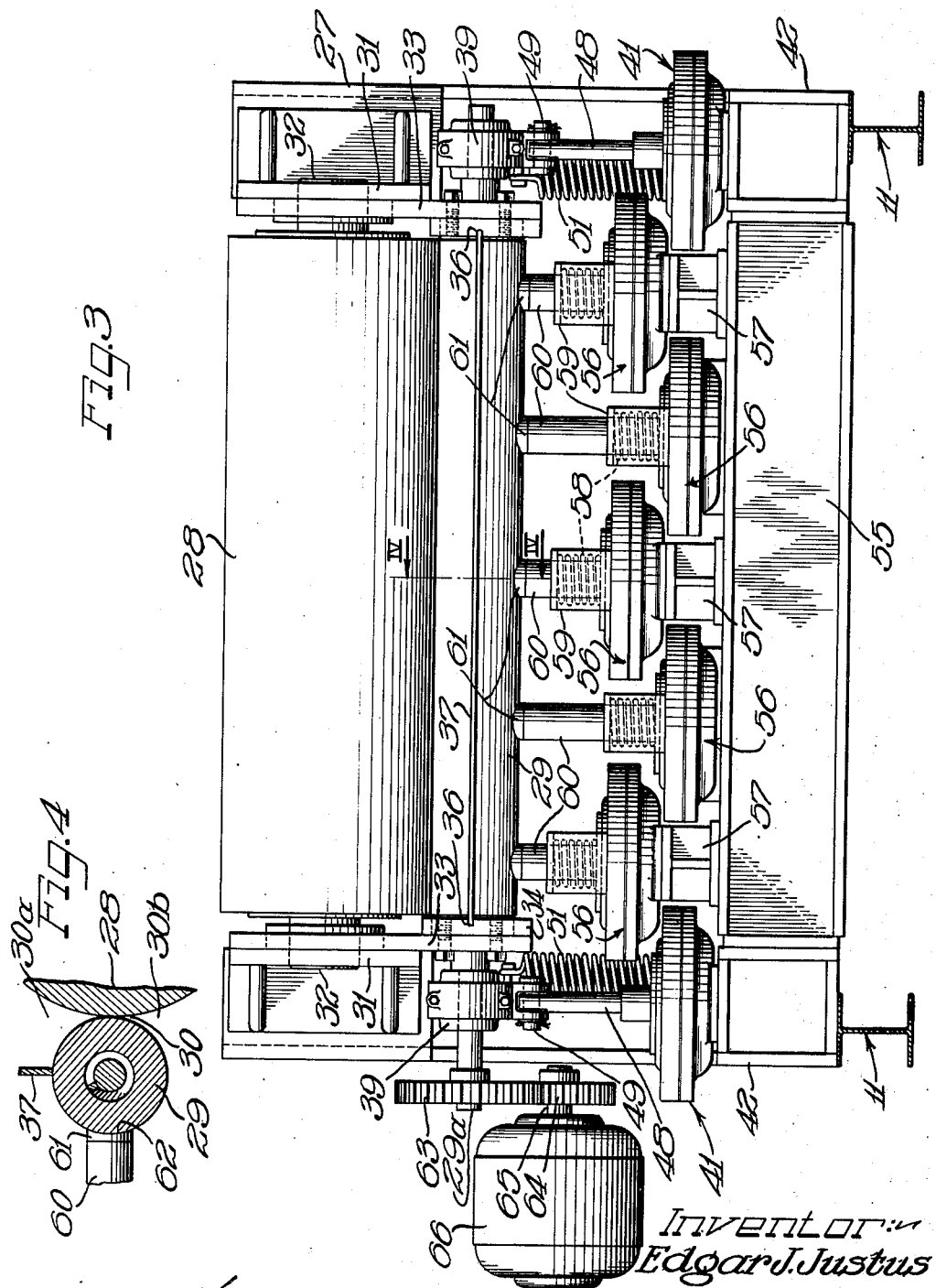
Inventor:
Edgar J. Justus
by Attys

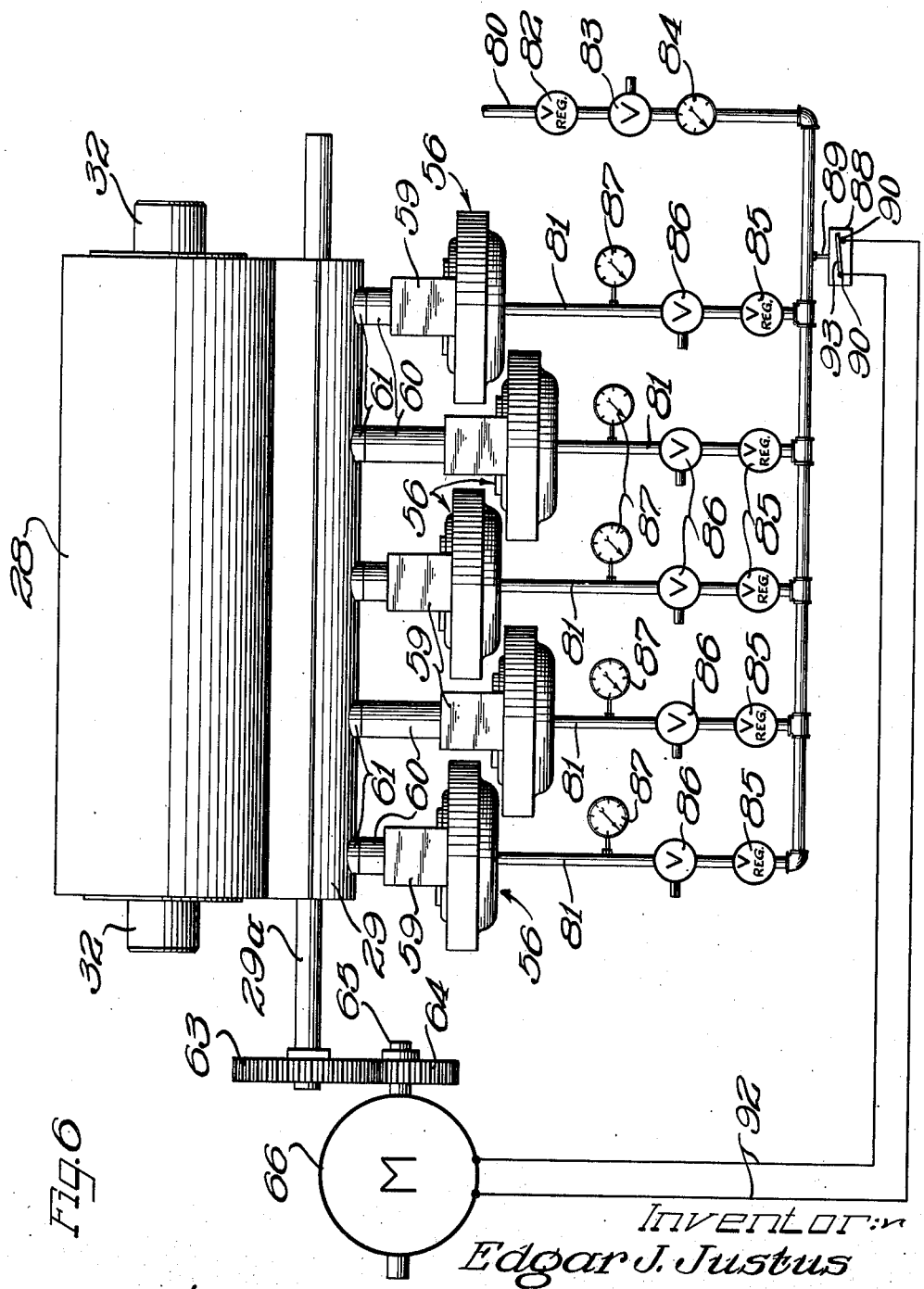

UNITED STATES PATENT OFFICE 2,651,077

MACHINE FOR COATING WITH THERMOPLASTIC MATERIALS

Edgar J. Justus, Beloit, Wis., assignor to Beloit Iron Works, Beloit, Wis., a corporation of Wisconsin Application December 30, 1950, Serial No. 203,623

6 Claims. (Cl. 18—9)

The present invention relates to an apparatus for forming a thermoplastic film, either self-supporting or as a coating for a flexible web, by the passage of thermoplastic material through a forming nip defined by relatively rotatable elements urged together under differential fluid pressures.

More particularly, the present invention relates to a thermoplastic film-forming machine or apparatus having a film-forming nip defined by a pair of relatively rotatable rolls, one of which is deflectable to follow the contour of the other roll, the one roll being provided with means for controlling its deflection to provide an accurate nip.

The instant invention will hereinafter be described as embodied in a machine for producing polyethylene films or coatings, but it will be appreciated that the apparatus of the present invention is adapted for use with materials which are plastic when heated, even though they are capable of being hardened by heat. Thus the instant invention may be utilized to produce films and coatings formed of materials which are eventually thermally set, but which are nevertheless thermoplastic when formed into the film or coating by operation of the machine.

In general, the machine of the present invention includes a pair of nip-forming elements which are relatively rotatable and which preferably take the form of generally cylindrical rolls of different size. The larger of the rolls is rotatable to provide a shearing element upon the surface of which the film is formed, or which supports the flexible web material upon which the film is deposited as a coating. The smaller of the rolls is longitudinally deflectable into substantially exact surface conformity with the shearing element and is urged against the larger roll by fluid pressure. Fluid pressure means are also provided at spaced points along the axial length of the smaller roll for controlling deflection of the smaller roll, which serves as a doctor element. Provision may also be made for individual control of the fluid pressure applied at any point.

The utilization of a relatively small doctor roll is particularly advantageous inasmuch as such a roll is more readily deflectable and the cooperation of the smaller roll with the larger shearing roll provides a nip having an open on-coming face ahead of the nip for supporting plastic material and for readily feeding the plastic material to the nip, while the open off-going face of the nip prevents the build-up of plastic material upon the doctor roll face.

The relatively large shearing roll is rotatable to shear plastic from a body supported at the nip, while the relatively small doctor roll is held against rotation so that a differential shearing action is obtained at the nip. Preferably, the smaller roll is adapted for rotation during machine shut-down periods to provide means for relatively easy cleaning of the roll by rotating the same in a solvent bath and also to readily present a new doctor roll face to the nip in case the doctor roll face should become worn or otherwise undesirable at one peripheral portion thereof.

The doctor roll is mounted for pivoting movement about a pivot point remote from the nip, so that movement of the doctor roll toward the shearing roll to define the nip takes place in an arcuate path, and fluid pressure means are provided for loading the roll about its pivot point against the shearing roll. As hereinbefore mentioned, other fluid pressure means are provided for backing up the roll at points longitudinally spaced along its axis, and the latter fluid pressure means accurately controls doctor roll nip pressure so that a uniform film will be produced.

It is, therefore, an important object of the present invention to provide an improved thermoplastic film-forming apparatus including a pair of relatively rotatably rolls which cooperate to define a film-forming nip and which are urged into nip-defining relationship under fluid pressure.

Another important object of the present invention is to provide a film-forming machine including a relatively large shearing roll and a relatively smaller doctor roll which is deflectable along its longitudinal axis so that it will readily conform to the contour of the shearing roll.

It is a further important object of the present invention to provide an improved film-forming machine including a shearing roll and a doctor roll of relatively small size which cooperates with the shearing roll to define a film-forming nip, the doctor roll being axially deflectable to accommodate itself to the contour of the shearing roll, and means being provided for controlling deflection of the doctor roll to provide an accurate nip.

Still another object of the present invention is to provide a doctor roll for cooperation with a shearing roll to define a film-forming nip, the doctor roll being axially deflectable along its length and being urged against the shearing roll by fluid pressure means spaced along the length of the doctor roll to control doctor roll deflection.

Yet a further important object of the present invention is to provide a pair of cooperable, relatively rotatable nip-forming elements for film-forming apparatus, the elements defining a nip which has an open on-coming face for feeding plastic material to the nip and an open off-going face to prevent a build-up of plastic material at the nip.

It is an additional object of the present invention to provide a film-forming machine having a nip defined by a pair of relatively rotatable rolls, one of the rolls usually being held against rotation during operation of the machine and being rotatable for cleaning and for presenting a different roll peripheral surface of the nip.

Yet another object of the present invention is to provide a film-forming apparatus including a shearing roll, a longitudinal deflectible doctor roll for cooperation therewith, and fluid pressure means for controlling doctor roll deflection including a plurality of longitudinally arranged fluid pressure diaphragms acting on the doctor roll and fluid control means for said diaphragm including a mster control means and an individual control means for each diaphragm to accommodate close control of doctor roll deflection.

Other and further important objects of the present invention will be apparent from the disclosures in the specification and the accompanying drawings.

On the drawings:

Figure 2 is an enlarged side elevational view of a film-forming apparatus of the present invention;

Figure 3 is a plan elevational view of the apparatus illustrated in Figure 2;

Figure 4 is a fragmentary sectional view with parts shown in elevation, taken along the plane IV—IV of Figure 3;

Figure 6 is a fragmentary plan view illustrating, in somewhat diagrammatic form, a fluid pressure control system for a film forming apparatus of the present invention.

As shown on the drawings:

Figure 1:
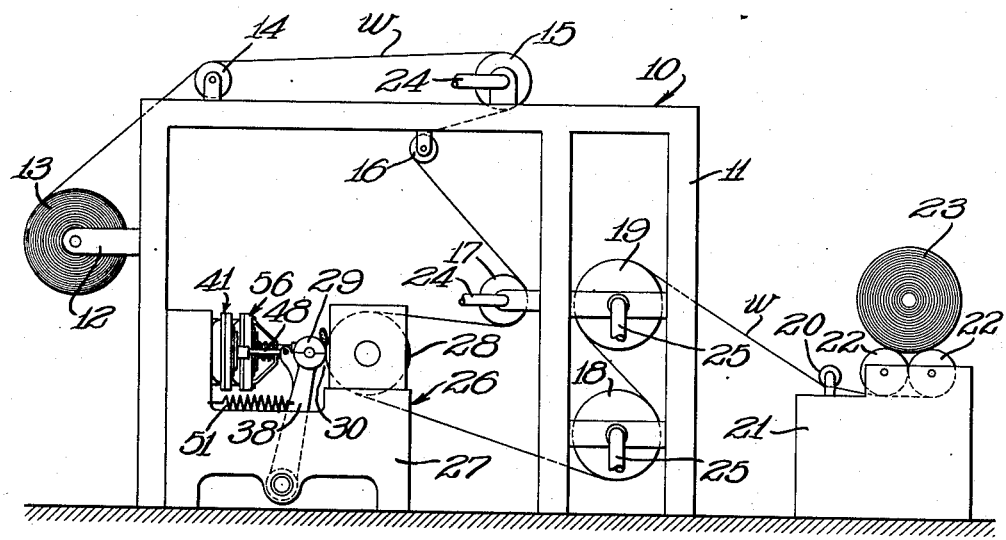
Figure 1 is a somewhat diagrammatic side elevational view illustrating a film-forming apparatus of the present invention for producing a self-sustaining film or a coating for flexible web material.

In Figure 1, reference numeral 10 refers generally to a film-forming apparatus made in accordance with the present invention and particularly adapted for depositing a thermoplastic coating upon a flexible web material, such as paper.

The machine includes a suitable frame work 11 carrying a winding reel 12 for a roll of paper 13, the paper web being trained about a guide roll 14, a steam-heated roll 15 for heating the web W, a guide roll 16, and a second steam-heated roll 17 receiving the web W from the guide roll 16. The frame work 11 also carries a pair of chill rolls 18 and 19 for receiving the web W thereabout after a thermoplastic material has been applied thereto, as will be hereinafter more fully explained. After passing about the chill rolls 18 and 19, the web W is guided by a guide roll 20 supported upon a winder base 21 under a pair of winder drums 22 which support and drive a superimposed winder roll 23. The pre-heating rolls 15 and 17 are each provided with an axially extending conduit 24 for introducing steam or other heating fluid into the interior of the rolls, and the chill rolls 18 and 19 are each provided with a similar axial conduit 25 for introducing a suitable refrigerant or other cooling liquid into the interior of these rolls.

Within the frame work 11 there is provided a coating machine 26 of the present invention, including a suitable supporting frame 27, a driven relatively large shearing roll 28, a relatively smaller doctor roll 29 cooperating with the shearing roll 28 to define therewith a film-forming nip 30, and means for supporting the doctor roll 29, as will be hereinafter more fully explained. The web W is trained from the second steam-heated roll 17 about the periphery of the shearing roll 28 to pass through the nip 30 enroute to the chill rolls 18 and 19 and the subsequent winding apparatus.

As best seen in Figures 2 and 3, the machine frame 27 includes upper upstanding pedestal portions 31 which journal the shearing roll 28 therebetween by receiving journal roll stub shafts 32 and appropriate bearing assemblies therein.

The upper portions of the pedestals 31 are provided with supporting plates 33 projecting beyond the pedestals to generally overlie a doctor roll 29, and the plates 33 are provided with depending end dams 34 which are arcuately contoured, as at 35, for cooperation with the periphery of the doctor roll 29. The dams 34 are provided with inner vertically extending grooves 36 which receive an elongated dam end plate 37, the dam end plate 37 and the dam ends 34 cooperating with the shearing roll 28 to define a space for receiving thermoplastic material which directly overlies and fully communicates with the nip 30.

The doctor roll 29 is supported for pivoted movement relative to the fixed, but rotatable, shearing roll 28 by means of an elongated pivot arm 38 at each axial end of the doctor roll. The pivot arms 38 carry at their upper ends doctor roll journals 39 which are radially split and urged together in firm clamping relation by clamping screws 40 which hold the doctor roll against rotation. The pivot arm 38 is pivotally attached, as by pivot pin 40, to a portion of the side frame members 27.

It will be seen that the doctor roll 29 is thus supported by the pivot arms 38 for movement in an arcuate path toward and away from the shearing roll 28 to define a nip of varying size therewith. Actually, each end of the doctor roll 29 is urged into cooperating relation with the shearing roll 28 by means of a fluid pressure unit 41 carried by an upstanding post 42 formed as a part of each of the side frames 27. A diaphragm unit 41 is provided for each end of the doctor roll 29 and only one such unit need be described.

As shown in Figures 2 and 3, the diaphragm unit comprises a fluid pressure-tight housing 43 defining an interior pressure chamber 44 having its open end closed by a flexible diaphragm 45 which is peripherally sealed within an outer, open-ended diaphragm housing section 46. The diaphragm 45 carries at its center a diaphragm plate 47 provided with a forwardly projecting actuating rod 48 which is pivotally attached, as at 49, to an embossment 50 formed integrally with the upper end of the pivot arm 38 immediately adjacent the doctor roll journals 39.

It will be seen that actuation of the diaphragm unit 41 by the introduction of fluid under pressure into the pressure chamber 44 will cause movement of the diaphragm 45 and corresponding movement of the actuating rod 48. Movement of the actuating rod 48, which is directly linked to a pivot arm 38, will cause the corresponding movement of the doctor roll 29 toward and away from the shearing roll 38. To insure movement of the doctor roll 29 from the shearing roll 28 and accurate following of the diaphragm by the doctor roll, a coil tension spring 51 is provided. The tension spring 51 has its ends secured, respectively, to the frame portion 42 and to the pivot arm 38 intermediate the length thereof to resiliently urge the doctor roll 29 from the shearing roll 28 against any fluid pressure exerted upon the diaphragm 45.

From Figures 3 and 4 it may be seen that a transversely extending I-beam 55 is provided to extend parallel to and in spaced relation to the doctor roll 29. This beam 55 joins the upstanding portions 42 of the side frames 27, and that end flange of the I-beam 55 facing the roll 29 carries a plurality of spaced diaphragm units 56 generally similar to the diaphragm unit 41 hereinbefore described in detail. Alternate diaphragm units 56 are spaced from the I-beam flange by means of supporting brackets 57 so that a number of diaphragm units 56 may be utilized with the diaphragm housings of adjacent units overlapping. The diaphragm units 56 are aligned along the length of the I-beam 55 and each unit is provided with an auxiliary return spring 58 confined within a cage 59 to encircle an actuating rod 60 for each diaphragm. The diaphragm springs 58 thus act against the cages 59 to urge the diaphragm units 56 rearwardly against the fluid pressure within the diaphragm chambers. The rod 60 of each of diaphragm units 56 extends toward the roll so as to lie in a common radial plane with respect to the roll, and the diaphragm rod ends are each provided with a shoe 61 (Figure 4) having an arcuate face 62 concentric with and mating with a corresponding peripheral portion of the roll 29. It will thus be seen that the diaphragm rods 60 serve to back up the roll 29 and that the individually mounted and actuatable diaphragm units 56 may be utilized to control the pressure exerted by any given longitudinal portion of the roll upon the nip 30.

The shaft 29a of the roll 29 projects axially through one of the split journal housings 39 carried by one of the pivot arms 38 (Figure 3) and this projecting axial end carries a gear 63 meshing with a gear 64 mounted upon the drive shaft 65 and an electric motor 66. It will be seen that upon energization of the motor 66 the roll 29 will be rotated at a speed determined by the driving speed of the motor and the two ratios of the gears 63 and 64.

Figure 5:
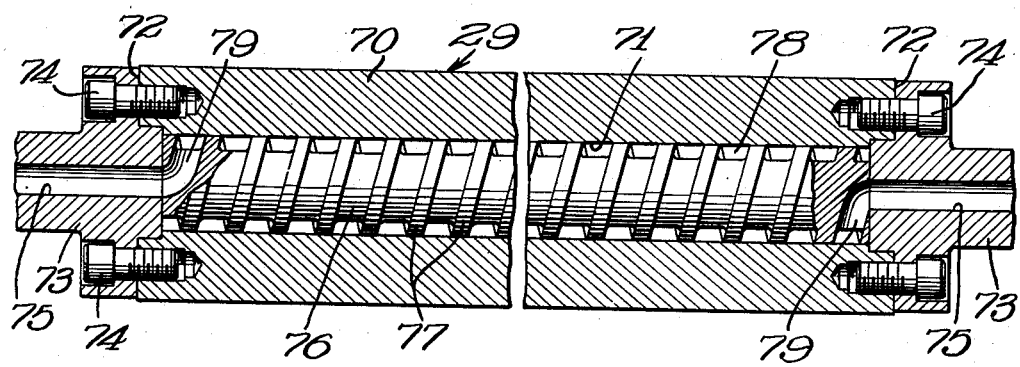
Figure 5 is a broken greatly enlarged sectional view, with parts shown in elevation, taken along the plane V—V of Figure 2.

The roll 29 is constructed as best seen in Figure 5, the construction including a central, generally cylindrical roll shell 70 having an axial bore 71 and end seating faces 72. The end seating faces 72 contact stub shafts 73 which are secured in flush contact with the faces 72 by suitable means, as by bolts 74. The stub shafts 73 are each axially bored as at 75 for communication with the roll shell bore 71, and a heat exchange rod 76 is provided to extend axially of the bore 71 in contact with the stub shafts 73. The heat exchange rod 76 is provided with a raised helical land 77 along the peripheral surface thereof, the land being dimensioned for smooth peripheral contact with the surface of the bore 71. The lands cooperate with the bore periphery to define a passage 78 adapted for the flow of heat exchange fluid axially of the roll, the passage 78 communicating with the stub shaft bores 77 by means of a joining passage 79 formed in the ends of the heat exchange rod 76 and fully registering with the stub shaft bore 75.

It will be seen that heated heat exchange fluid circulated through the heat exchange passage 78 will serve to heat the roll shell 70, and this circulation may be obtained by means of suitable pumping apparatus or the like communicating with a source of heat exchange fluid and joined to the stub shaft bore 75.

The operation of applicant's invention, which has been hereinbefore described in detail, will be readily appreciated by those skilled in the art. It will be seen that the shearing roll 28 cooperates with the doctor roll 29 to define a restricted nip 30 through which plastic material passes to be formed into a film. The roll 29 is heated by the flow of heat exchange fluid therethrough, as hereinbefore described, and this heat is applied at the nip 30 of the machine.

As best illustrated in Figure 4, the nip 30 which is defined by the relatively large shearing roll 28 and the comparatively smaller doctor roll 29 possesses several desirable characteristics. Utilization of differentially sized rolls provides a nip having relatively open on-coming and off-going faces. The on-coming face 38 is adapted to receive a body of thermoplastic material to be formed into a film at the nip, and the open nip face serves to accurately feed the thermoplastic material to the nip itself. The thermoplastic material reservoir provided by the dam construction hereinbefore discussed directly overlies the nip and is in full communication with the on-coming face 38. The off-going face 30b of the nip is also relatively open so that no restriction to passage of a film through the off-going face is provided, and there is no build-up of plastic material upon the doctor roll at the off-going face.

The doctor roll 29 is held against rotation during film-forming operation of the machine by the utilization of the split journal brackets 39 carried by the pivot post 28. In this manner, effective shearing action is obtained by the relative rotation of the rolls 28 and 29. However, the roll 29 may be rotated by the utilization of the motor 66 and the gears 63 and 64 if desired. To carry out such rotation, the pressure within each of the diaphragm units 56 is released and the spring 58 acting upon the diaphragms forces the rods 60 and the saddles 61 carried thereby from contact with the roll, so that the entire working periphery of the roll is exposed. The pressure-applying rods 60 are thus retractable from contact with the doctor roll 29. Next, the roll may be rotated in nip position by means of the motor 66 for cleaning the roll by retaining a bath of solvent or other suitable material in the nip to remove any plastic material which might have adhered thereto during the previous film-forming cycle.

If it is desired to merely present a new face of the roll 29 of the nip, it is only necessary that the motor 66 be energized while the roll is retained in nip relation, and rotation of the roll will be readily accomplished by means of the motor without the necessity of removing the roll from nip contact.

It will be noted that the means for controlling distortion or deflection of the roll 29 along its axial length, namely, the diaphragm units 56, are not directly or rigidly connected to the roll, so that rotation of the roll is accommodated.

By the utilization of a relatively small doctor roll, the doctor roll is readily distortable under the fluid pressures which are exerted at the nip to conform to the contour of the more rigid shearing roll 28. However, such contour distortion may be readily controlled by utilization of the diaphragm units 56.

As illustrated in Figure 6 of the drawings, the present invention also provides fluid pressure control means for the diaphragm units 56, so that control of doctor roll deflection along the length thereof may be attained by individual and concurrent control of the separate diaphragm units 56. More specifically, as illustrated in Figure 6, the control system includes a main fluid pressure line 80 connected to a suitable source of fluid, such as air, under pressure. The main fluid pressure line 80 communicates with a plurality of branch lines 81 leading to each of the individual fluid pressure diaphragm units 56. Thus, communication of each of the diaphragm units with a source of fluid pressure is provided.

The main line 80 has disposed therein, ahead of the branch lines 81, a pressure regulator 82 of conventional design, such as the diaphragm-controlled regulator valve. Also, the line 80 is provided with a manually-operated exhaust valve 83 having two positions for accommodating fluid flow therethrough and for movement to a closed position in which the pressure regulator 82 is bled to the circumambient atmosphere.

A visually indicating pressure gauge 84 is also provided in the main line beyond the valve 83 and the regulator 82 so that a visual indication of pressure within the line 80 is afforded.

Each of the individual branch lines 80 is provided with a pressure regulator 85 substantially identical with the regulator 82 hereinbefore described, with a manually-controlled valve 86 similar to the valve 83, and with a pressure gauge 87 corresponding to the gauge 84 hereinbefore described.

An additional control element which is pressure-controlled by the pressure within the main line 80 is a switch 88, vented to pressure in the line 80 ahead of the individual conduits 81 by means of pipe 89 and having a pair of fixed conduits 90 connected to the dryers 92 which in turn control energization of the motor 66 hereinbefore described. The fixed switch contacts 90 are adapted to be closed by means of a movable switch element 93 which is pressure-actuated by suitable means, as by a pressure-controlled diaphragm, so that the contacts are closed whenever pressure within the line 80 drops to zero or to desired minimum. Conversely, the contacts 90 are open and the motor will not be energized when there is fluid pressure within the line 80, and consequently upon the pressure diaphragm units 56. In this manner, it is impossible to energize the motor 66 when the diaphragm units are energized and there is nip contact between the shearing roll 28 and the doctor roll 29.

Thus it will be seen that the pressure regulators 85 and the manually-controlled valves 86 in the branch lines 81 afford individual control for the various diaphragm units, while the pressure regulator 82 and the manually-controlled valve 83 control the fluid pressure which is supplied to the branch lines. In this manner, a positive control is provided for the entire system and also for each individual fluid pressure member. In addition, the valves 83 serve an exhaust function to bleed the pressure regulators 82 to the atmosphere when the valve 83 is moved to its "off" position, this function of the valve being accommodated by virtue of its location with respect to the pressure regulators adjacent thereto.

It will be understood that modifications and variations may be effected without departing from the scope of the novel concepts of the present invention.

I claim as my invention:

1. Apparatus for forming a film from thermoplastic material which comprises a rotatable shearing roll, a relatively small doctor roll cooperating with said shearing roll to define a nip therebetween, means normally clamping said doctor roll against rotation, means for rotating said doctor roll to present a different peripheral portion thereof to said nip, and retractable means for urging said doctor roll intermediate its length toward said nip while not interfering with doctor roll rotation, said last-mentioned means including a plurality of diaphragm units wherein the diaphragms are movable in response to fluid pressure spaced along the axial length of said doctor roll and adapted to communicate with a source of fluid under pressure, diaphragm connected rods urged by the diaphragms into contact with said doctor roll, and spring means acting on said units for removing said rods from said contact when communication of said units with said source is interrupted.

2. Apparatus for forming a film from thermoplastic material which comprises a rotatable shearing roll, a doctor element cooperating with said shearing roll to define a nip therebetween, a pivot arm supporting said doctor element for movement toward and away from said shearing roll in an arcuate path, a fluid pressure actuated diaphragm adapted to communicate with a source of pressure for urging said doctor element in response to said pressure toward said shearing roll, and resilient means acting on said pivot arm to counterbalance fluid pressure action against said diaphragm and to urge said doctor element from said shearing roll when pressure on said diaphragm is relieved.

3. Apparatus for forming a thermoplastic film from thermoplastic material which comprises a pair of relatively rotatable nip-defining elements including a relatively large rotatable shearing element and a smaller longitudinally deflectable doctor element, retaining means for normally holding said doctor element against rotation, individual fluid pressure responsive diaphragm means spaced along the length of said doctor element for urging said elements together to define said nip and to control distortion of said doctor element, means for controlling fluid pressure supplied to said diaphragm means, means for rotating said doctor element upon release of said retaining means for cleaning the same and for presenting a new doctor element face to said nip, and control means for preventing rotation of said doctor element despite release of said retaining means when said diaphragm units urge said doctor element into nip-defining relation with said shearing element.

4. Apparatus for forming a film from thermoplastic material which comprises a rotatable shearing roll, a relatively small doctor roll cooperating with said shearing roll to define a nip therebetween, means normally clamping said doctor roll against rotation, means for rotating said doctor roll to present a different peripheral portion thereof to said nip, and retractable means for urging said doctor roll intermediate its length toward said nip while not interfering with doctor roll rotation, said last mentioned means including a source of fluid under pressure, a plurality of fluid pressure-responsive diaphragm means spaced along the axial length of said doctor roll and communicating with said source of fluid under pressure, rods mounted on said diaphragm means and urged thereby into contact with said doctor roll, and spring means acting on said diaphragm means for removing said rods from said contact when communication of said diaphragm means with said source of fluid under pressure is interrupted.

5. Apparatus for forming a film from thermoplastic material which comprises a rotatable shearing roll, a doctor element cooperating with said shearing roll to define a nip therebetween, a pivot arm supporting said doctor element for movement toward and away from said shearing roll in an arcuate path, a source of fluid under pressure, fluid pressure actuated diaphragm means adapted to communicate with said source of fluid under pressure and to urge said doctor roll element toward said shearing roll in response to fluid pressure actuation, and resilient means acting on said pivot arm to urge said doctor element away from said shearing roll when pressure on said diaphragm means is relieved.

6. Apparatus for forming a thermoplastic film from thermoplastic material which comprises a pair of relatively rotatable nip-defining elements including a relatively large rotatable shearing element and a smaller longitudinally deflectable doctor element, retaining means for normally holding said doctor element against rotation, individual fluid pressure-responsive diaphragm means spaced along the length of said doctor element for urging said elements together to define said nip and to control distortion of said doctor element, a fluid pressure source for supplying pressure to said diaphragm means, means for controlling fluid pressure supplied to said diaphragm means, means for rotating said doctor element upon release of said retaining means for cleaning the same and for presenting a new doctor element faced to said nip, and control means for preventing rotation of said doctor element despite release of said retaining means when said diaphragm means urge said doctor element into nip-defining relation with said shearing element.

EDGAR J. JUSTUS.

References Cited in the file of this patent

UNITED STATES PATENTS

| Number | Name | Date |
| --- | --- | --- |
| 1,302,352 | French | Apr. 29, 1919 |
| 1,312,034 | Jones | Aug. 5, 1919 |
| 1,482,351 | Dausman | Jan. 29, 1924 |
| 1,598,721 | Hitchcock | Sept. 7, 1926 |
| 1,632,760 | Jones | June 14, 1927 |
| 1,741,211 | Vallier | Dec. 31, 1929 |
| 1,816,307 | Von Reis | July 28, 1931 |
| 1,993,055 | Gerstenberg | Mar. 5, 1935 |
| 2,560,572 | Haywood | July 17, 1951 |